US006547972B1

(12) United States Patent
Stahl et al.

(10) Patent No.: US 6,547,972 B1
(45) Date of Patent: Apr. 15, 2003

(54) CENTRIFUGE WITH EJECTOR FOR SOLIDS

(75) Inventors: Werner Stahl, Landau (DE); Harald Reinach, Remetschwiel (DE)

(73) Assignee: Ferrum AG, Rupperswil (CH)

( * ) Notice: Subject to any disclaimer, the term of this patent is extended or adjusted under 35 U.S.C. 154(b) by 0 days.

(21) Appl. No.: 09/979,478

(22) PCT Filed: Apr. 5, 2000

(86) PCT No.: PCT/CH00/00198

§ 371 (c)(1),
(2), (4) Date: Nov. 14, 2001

(87) PCT Pub. No.: WO00/72974

PCT Pub. Date: Dec. 7, 2000

(30) Foreign Application Priority Data

May 27, 1999 (EP) ........................................... 99810460

(51) Int. Cl.[7] ............................ B01D 33/76; B04B 3/04

(52) U.S. Cl. .................... 210/781; 210/360.1; 210/374; 210/380.1

(58) Field of Search ................................ 210/781, 145, 210/360.1, 369, 370, 372, 374, 380.1, 380.3

(56) References Cited

U.S. PATENT DOCUMENTS 2,718,309 A * 9/1955 Saxe
2,858,942 A * 11/1958 Wenzelberger
4,366,951 A * 1/1983 Belsky et al.
4,493,769 A * 1/1985 Paschedag et al.
5,030,348 A * 7/1991 Bengt
5,186,834 A * 2/1993 Arai
5,653,879 A * 8/1997 Schroeder
6,261,417 B1 * 7/2001 Iwashige

FOREIGN PATENT DOCUMENTS

| | | | |
|---|---|---|---|
| CH | 452441 | A | 5/1968 |
| DE | 1960015 | A | 9/1970 |
| DE | 3236428 | A | 7/1983 |
| WO | WO 82 01668 | A | 5/1982 |

OTHER PUBLICATIONS

V. E. Petrov, et al.: "Centrifuge Vertical Perforation Rotor Screw Conveyor Move Reciprocal up down Rotor Discharge Sediment" *Paramonov*, Apr. 15, 1983, Abstract Database WPI, XP–002118317.

* cited by examiner

*Primary Examiner*—Fred Prince
(74) *Attorney, Agent, or Firm*—Townsend and Townsend and Crew LLP

(57) ABSTRACT

The invention relates to a centrifuge comprising a rotating drum (1) and comprising an ejection element (2) which rotates together with the drum in order to eject a cake (3) of solids, which is deposited on the inner side of the drum, in the axial direction (4). The ejection element (2) has a helix (5) which extends over the length of the drum. The helix (5) and the drum (1) are kinematically connected in such a manner that a reference point (A) at the circumference of the helix executes a rotational movement relative to the drum in the form of a sawtooth line (6, 8), with a first flank (7) of the sawteeth (8) corresponding approximately in its inclination (α) to the pitch (β) of the helix whereas a second flank (9) of the sawteeth (8) corresponds to an approximately axial ejection movement.

20 Claims, 7 Drawing Sheets

CENTRIFUGE WITH EJECTOR FOR SOLIDS

BACKGROUND OF THE INVENTION

The invention relates to a centrifuge comprising a rotating drum and comprising an ejection element which rotates together with the drum in order to eject a cake of solids which is deposited on the inner side of the drum in the axial direction of the drum.

The development of centrifuges divided up very early into different special applications in order to meet the differing needs of the process technology. The filter cake of a sedimentation or filtration centrifuge can be a mayonnaise-like mass, a rheologically pasty mass or a mass in the form of a saturated or unsaturated agglomeration with a Mohr breaking limit curve.

Thus there is for example an inverting filter centrifuge by the company Heinkel GmbH, D-74303 Bietigheim-Bissingen, Germany, in which a charge-wise filling, washing, spin drying and emptying by means of a stroke over the entire drum length are possible. Movable cloth is used as an inverting filter, which is accompanied by a not inconsiderable risk that cloth abrasions enter into the product. A quasi continuously operating double pusher centrifuge is show in patent specification EP 0 635 309 in which an intermittent pusher floor is arranged in a sieve drum and alternately moves a ring of solid material which has arisen in its "wake" axially outwardly by a stroke length. A disadvantage of the pusher centrifuges consists in that in freshly deposited filter cakes the maximum arising pusher pressure which occurs over a saturated agglomeration is the greatest at the pusher floor.

SUMMARY OF THE INVENTION

It is an object of the present invention to show a centrifuge which can be adapted to different products and can permit different operating modes. This object is satisfied in that the ejector element has an ejector surface in the form of a screw-shaped helix, and in that the helix and the drum are kinematically connected in such a manner that a reference point at the periphery of the helix executes a rotational movement relative to the drum in the shape of a sawtooth line, with a first flank of the sawteeth corresponding approximately in its inclination to the pitch of the helix whereas a second flank of the sawteeth corresponds to an approximately axial ejection movement.

This arrangement has the advantage that by means of a small but repeated stroke in the axial direction, a reliable ejection of the solid cake which is largely independent of the product properties takes place due to the axial extent of the helix over the entire length of the drum. At the same time constructional advantages arise since only a small stroke is required for the ejection movement in the axial direction. Because the backward movement of the helix in its own path takes place through a combination of rotation and translation relative to the drum, with it being possible to select the speeds during the passing through of the first and second flanks, that is, the backward rotational and feed movement, a simple adaptation to different properties of the solid cake is possible.

If the inclination of the first flank of a sawtooth agrees exactly with the pitch of the helix, the lowest resistances arise to the rotating back of the helix in its own path. This can be exploited through an intentional choice of the absolute direction of rotation of the drum and the helix in regard to the pitch of the helix in such a manner that the guiding of the solid cake is sufficient in order for example to rotate back a multiple thread helix in its path with a braking torque with respect to the rotation of the helix and with an axial draw force. An apparatus of this kind would for example require only a hydraulic displacing piston and a load switching coupling with a brake instead of a second drive for the helix. The kinematic connection for the backward running in its own path would then be given through the helix in the solid cake itself.

If the relative rotational movement between the helix and the drum is intentionally controlled in such a manner that the first flank of the sawteeth deviates somewhat from the pitch of the helix, a trench can arise at the helix during the passing through of this flank, which can be very helpful in order additionally to collect and drain off liquid. The latter can emerge axially out of the cake or stand above the cake. If the inclination of the first flank is less than the pitch of the helix, a slight ejection movement also still arises while passing through the first flank, and at the other side of the helix a trench arises if the solid cake is only locally yielding in slight ejection movements.

If the relative movement on the sawtooth line is for example hydraulically controlled and a reversal of the movements on the sawtooth line is possible, then a plurality of process stages can also be performed charge-wise. Thus for example when viewed in the axial direction a suspension can first be filled in the middle of the drum and at first be centrifuged in order to give off liquid, and then be brought into a washing region of the drum through "backward running on the sawtooth line" and, after the washing and compressing of the solids, transported in the ejection direction over the filling-in position through a "forward running on the sawtooth line". A charge-wise operation also permits a superimposed drying such as for example vapor pressure or compressed air dehumidification.

A further possibility which can be relatively simply realized with a hydraulic piston via a valve control consists in superimposing a vibration in the axial direction on the helical movement in order to exploit the rheological properties of the cakes for the further dewatering.

Simple control systems for centrifuges of this kind can also be such that a continuous, slow rotational movement is produced between the helix and the drum. The axial movement of the helix is produced by a hydraulic piston, which has a velocity component in the axial direction corresponding to the tangential velocity of the helix in order to form a suitably composed velocity in the direction of the first flank of a predetermined sawtooth. If a slower rotational movement between the helix and the drum is chosen, then the time interval for the deposition of the cake increases. For the second flank of the sawtooth a rapid stroke takes place in the opposite direction in order to move the solid cake axially in the ejection direction.

The invention will be described in the following with reference to exemplary embodiments.

DESCRIPTION OF THE PREFERRED EMBODIMENTS

Figure 1:
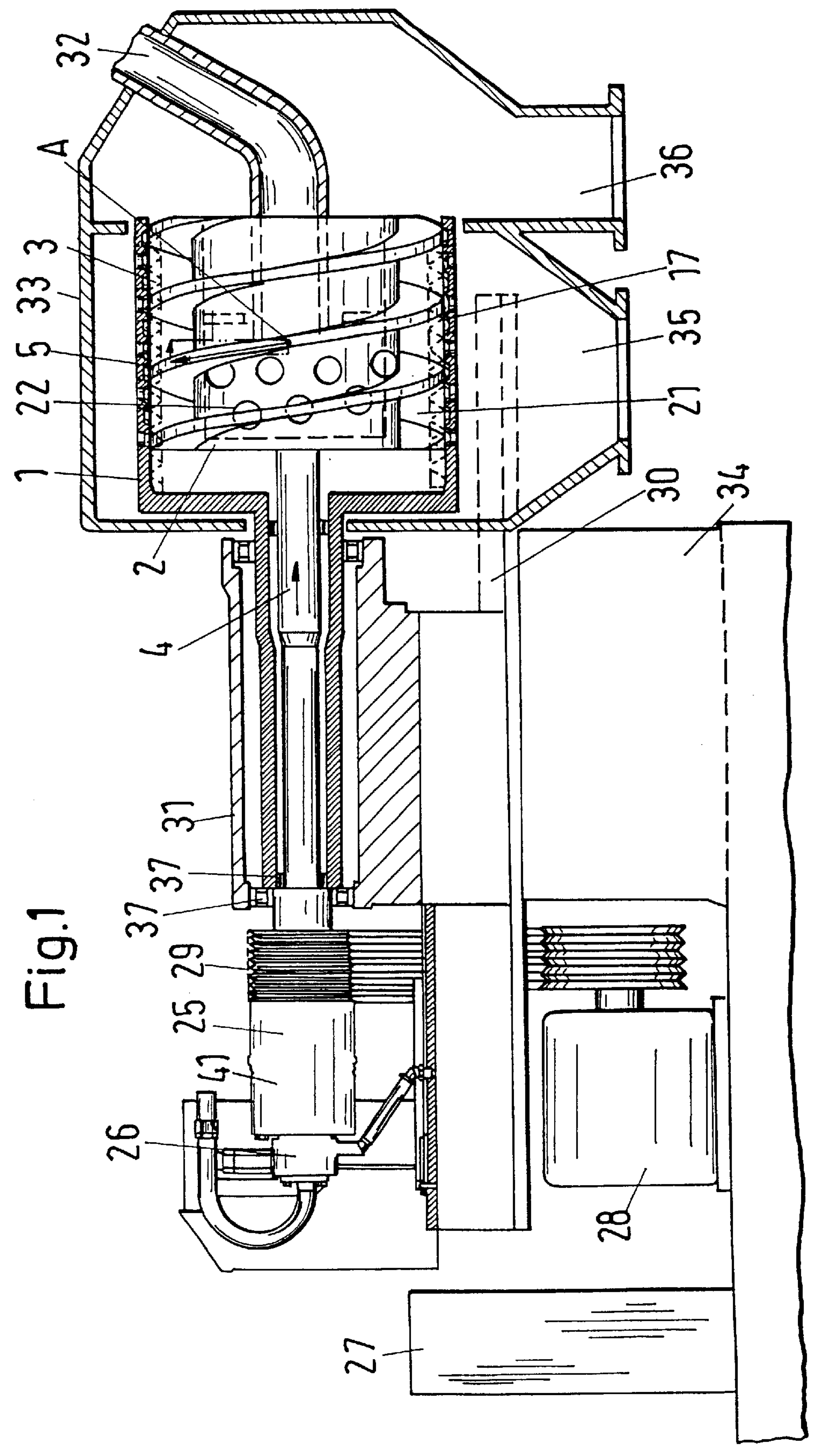
FIG. 1 is a side view of a pusher centrifuge comprising a sieve drum, comprising an ejector element in the form of a screw-shaped helix and comprising a product input from the ejection side.

The figures show a centrifuge comprising a rotating drum 1 and an ejection element 2 which rotates together with the drum 1 in order to eject a cake 3 of solids which is deposited on the inner side of the drum 1 in the axial direction 4. The ejection element 2 has a helix 5 which extends over the length of the drum. The helix 5 and the drum 1 are kinematically connected in such a manner that a reference point A at the circumference of the helix executes a rotational movement relative to the drum in the shape of a sawtooth line 6, with a first flank 7 of the sawteeth corresponding approximately in its inclination $\alpha$ to the pitch $\beta$ of the helix whereas a second flank 9 of the sawteeth corresponds to an approximately axial ejection movement.

Figure 10:
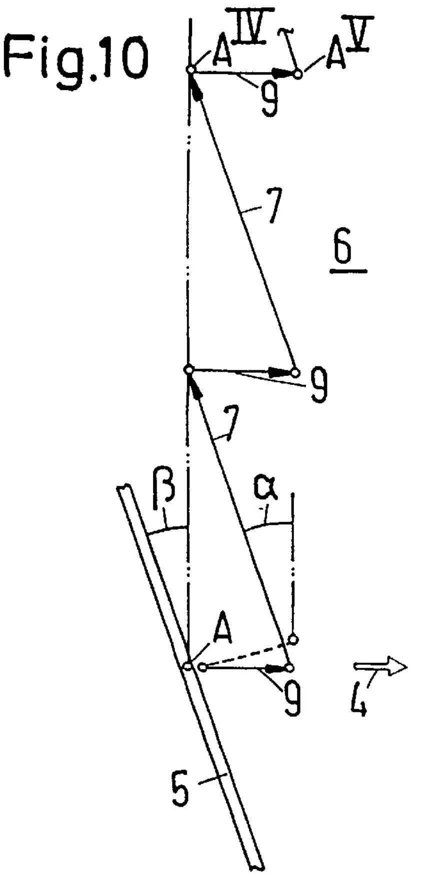
FIG. 10 shows, as a developed projection, a sawtooth line which a point passes through relative to the drum.
Figure 11:
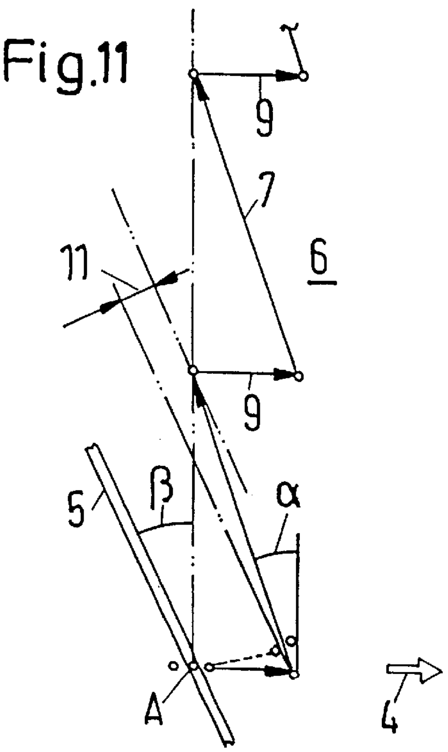
FIG. 11 shows a sawtooth line as in FIG. 10, with the inclination angle $\alpha$ of the first flank being kept less than the pitch angle $\beta$ of the helix during the backward stroke in order to produce a trench towards the ejection side.

In FIG. 1 a pusher centrifuge is shown, the ejector element 2 of which lies in contact at the inner side of a circular cylindrical drum 1 in the shape of a helix 5. The raw product is introduced in the form of a suspension via an infeed tube 32 into the rotating drum 1 and is delivered to the drum via the ejector element, being designed as a hollow shaft 20, via apertures 22 in a filling zone 21 and is centrifuged out. The drum has a sieve-shaped surface on which the solid component deposits to form a cake 3. The helix executes a rotational and a translational movement relative to the drum in such a manner that a point A at the circumference of the helix describes a sawtooth line 6 (see FIG. 10). A first flank 7 of a sawtooth 8 is obtained in that the backward stroke and the rotation relative to the drum are coupled to one another in such a manner that the helix moves backwards in its own path. A cake 3 which may have been deposited against the rear side is incised by the helix 5. When the rear axial end position is reached the relative rotational movement between the helix 5 and the drum 1 can be interrupted and it can be delayed until the forming cake 3 satisfies the conditions for an ejection stroke in the axial direction. The stroke which the helix 5 executes in the axial direction need only be a fraction of its total axial length since it extends up to the discharge from the drum 1 in order to ensure the axial transport of the cake. In order to improve the discharge of the liquid or in order to vary the consistency of the solid component, a short-stroke axial oscillation can be superimposed on the sawtooth movement of the helix which passes through the cake over a plurality of rotations and thus transmits an axial movement in all regions. Through this for example the thixotropy point of a gel can be overcome.

Figure 18:
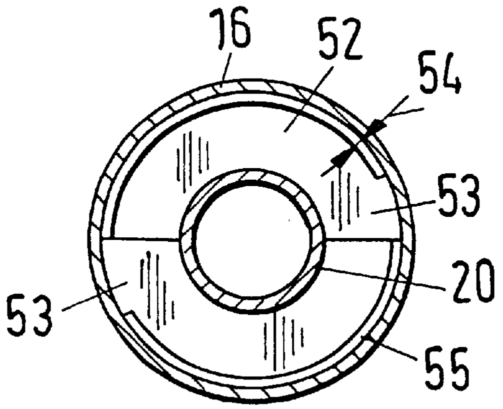
FIG. 18 is a cross-section through an arrangement in which a base layer is moved more slowly on the average in the filling zone.

In this depositing of the solid component, which takes place continuously, the sieve 17 is always covered over with solid parts—even in the filling zone 21—so that the filter action of the solid parts is constantly self-maintaining. This is an advantage particularly in solids with different particle size because a high removal is achieved. The sieve never lies completely free, through which fewer small solid particles become lost. A further possibility of amplifying this effect is shown in FIG. 18. A double helix 52 is set back relative to the drum jacket 16 in the filling zone along the length of the axial stroke in each case by a gap 54 of several millimeters with the exception of a small sector 53 at its beginning. This has as a result that a base layer 55 which has a better filter action remains adhering during the axial ejection and that the base layer is axially forwarded only in the region of the sector. The base layer which thus arises in the region of the axial stroke is pushed through more slowly on the average. The user need merely take care that with the rotation on the sawtooth line the sector 53 comes into engagement everywhere at the circumference in order that no incrustations arise.

The cake 3 is pushed step-wise to the outlet of the open drum 1 and a ring segment of the cake is centrifuged off at every step. A housing 33 catches in two separate zones the centrifuged off liquid and the centrifuged off solid components, which emerge separately from an outlet 35 and a discharge opening 36.

The drum 1 and the helix 5 are mutually rotatably journalled in a bearing support 31 and are driven by means of a main drive motor 28 via a belt drive 29. A base plate 30 which is placed on a foundation 34 supports the bearing block 31, the housing 33 and a sawtooth converter 41 which produces the relative sawtooth movement between the helix and the drum. A control system 27 coordinates the operating data of the apparatus and controls the sawtooth converter 41. The speed with which the flanks 7, 9 of a sawtooth are passed through can be set. In addition, pauses in the relative rotation of any desired length can be inserted at the reversal points for the axial stroke; i.e. the drum and the helix rotate at the same speed in order to adapt the time point for the ejection movement corresponding to the second flank 9 of a sawtooth to the most favorable moment in the process.

Figure 2:
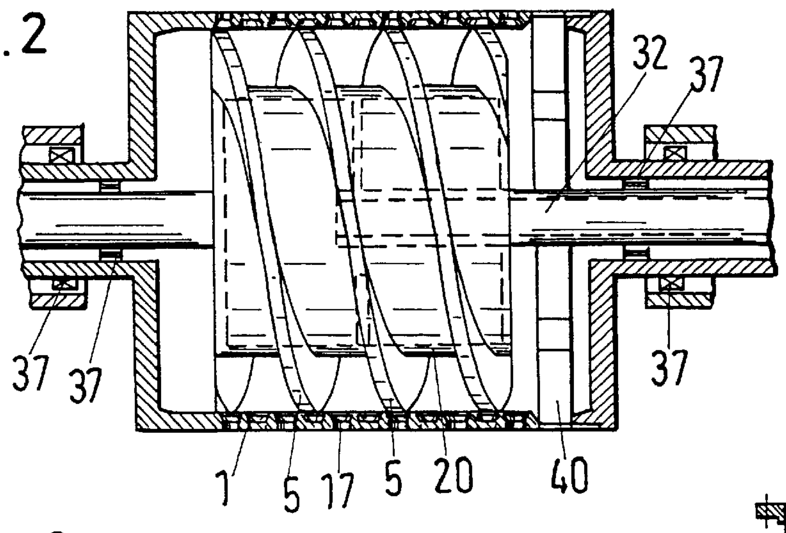
FIG. 2 shows the drum and the helix in a two-sided journalling, with the product being supplied via a hollow shaft.

In the example of FIG. 2 the drum 1 and the helix 5 are supported at both sides by bearings 37, with a stub shaft of the helix being designed as an infeed tube 32. The actual helix 5 is supported on a hollow shaft 20 in order to bring the product via apertures 22 into the actual filling zone 21. In addition the cylindrical drum is lined at its inner side with a finer sieve 17. The drum 1 is assembled from two parts and has spin-off windows 40 at the ejection side through which solid particles enter into the housing. The helix itself is executed to be double-threaded.

Figure 3:
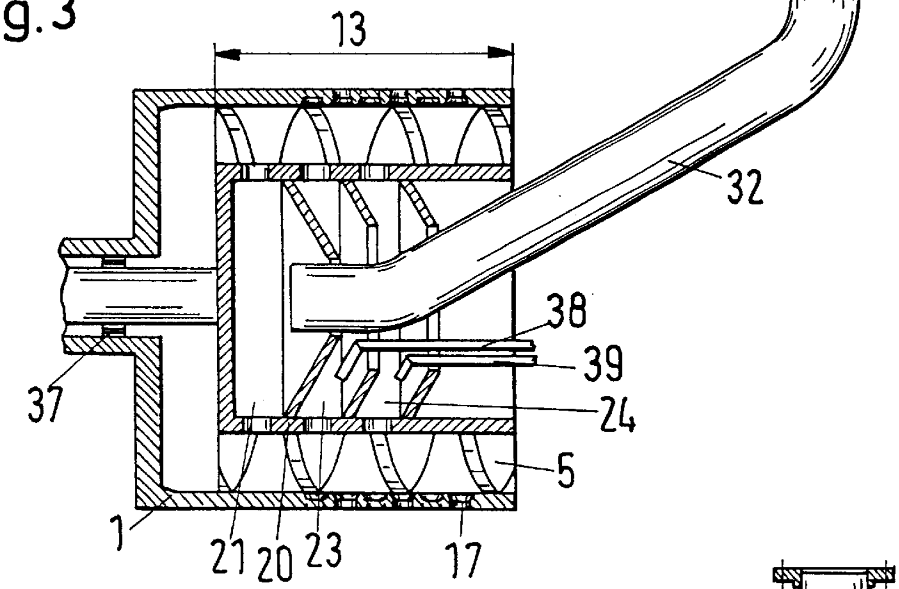
FIG. 3 shows the drum and the helix in an arrangement in accordance with FIG. 1, with the helix being subdivided into a plurality of zones in which different products are supplied.
Figure 4:
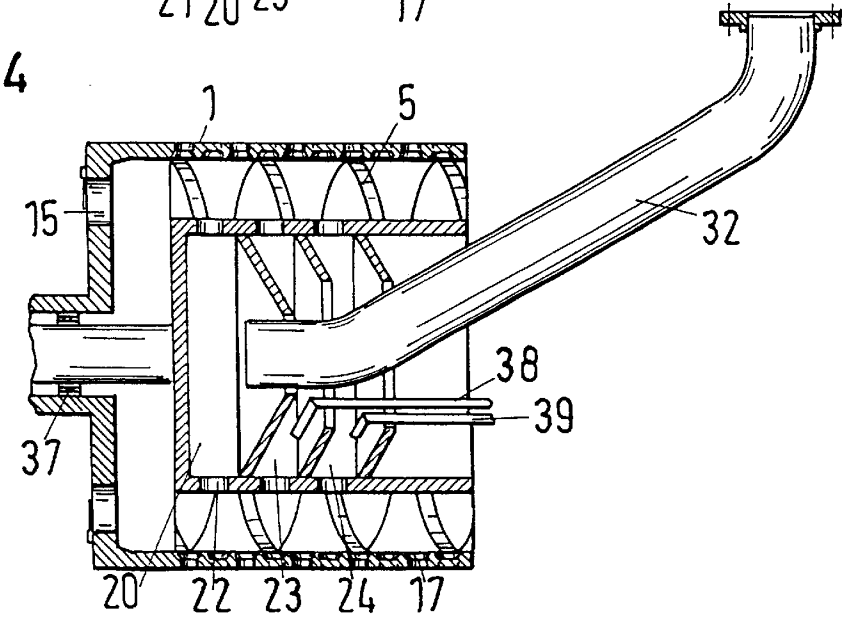
FIG. 4 shows an arrangement as in FIG. 3 in which the drum is provided with a level setting.

In the example of FIG. 3 the sieve 17 does not extend over the entire length 13 of the helix 5. Instead, next to the filling zone 21, through which the product is introduced from the infeed tube 32, there border two further zones 23, 24, through which further reagents such as e.g. washing liquids can be introduced via tubes 38, 39. In addition, as shown in FIG. 4, outlet openings 15, at which the height for the liquid level in the rotating drum can be determined by means of adjustable coverings, can be provided at the end side of the drum 1.

Figure 5:
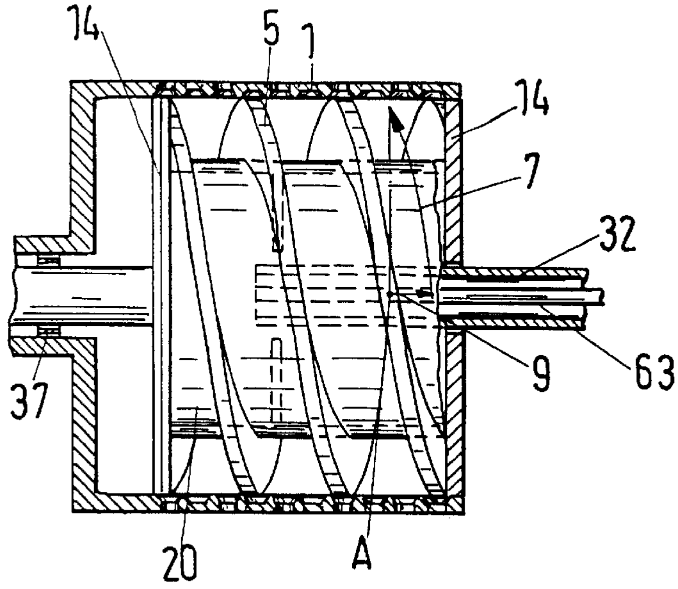
FIG. 5 shows an arrangement in accordance with FIG. 1 in which the helix is provided with sealing discs which seal radially or axially against the drum in the drawn-back position and open the ejection side in an ejection stroke.

In the example of FIG. 5 the helix 1 is likewise designed as a hollow shaft 20. The actual helix is sealed off against the drum 1 at both ends by side walls 14. During the ejection a gap arises at the outlet side through which the solids are centrifuged off; i.e. a point A on the circumference of the helix moves together with the cake on the second flank 9 of a sawtooth in the ejection direction and then, for closing, together with the co-moving side wall 14 back into a rear initial position on the first flank 7 of the sawtooth. In relatively fluid products the closure process can also be carried out relatively rapidly and in return a longer dwell time can be provided in the rear initial position until the consistency is great enough for the next small ejection movement. Especially in a multiple thread helix there is the advantage that only short cake lengths need be displaced in the axial direction per ejection area; i.e. the sum of the pushing forces in the cake becomes smaller. This arrangement thus brings about the advantage over a charge-wise operating inverting filter centrifuge that a continuous supply of the product is possible and that the dimensions are smaller as a result of the small axial movements. The closing of the drum 1 by means of the side wall 14 at the ejection side also has the advantage that compressed air for increasing the pressure in the drum can be fed in via a tube 63 which is placed coaxially in the infeed tube 32.

Figure 6:
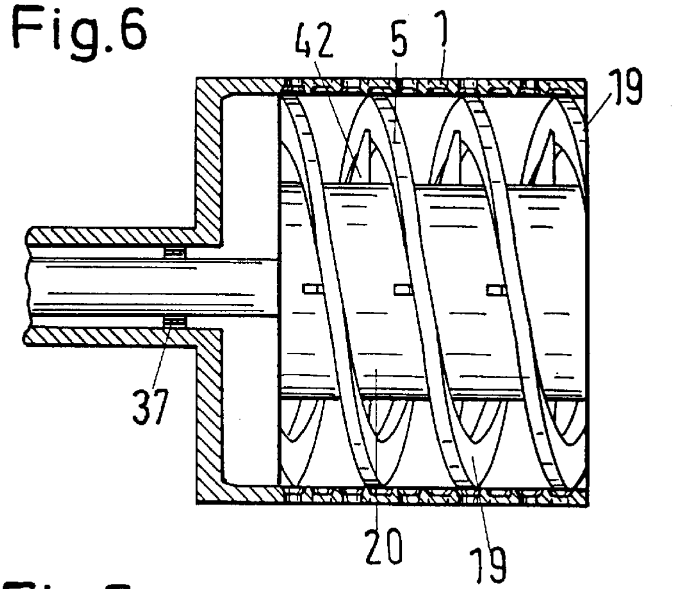
FIG. 6 shows an arrangement in accordance with FIG. 1 in which the helix is executed as a two-thread ribbon spiral.

In the example of FIG. 6 the helix 5 is executed as a ribbon spiral 19 which is secured at the hollow shaft 20 via supports 42. The helix is double-threaded; i.e. two ribbon spirals are arranged with a displacement of 180° with respect to one another. The ribbon spiral permits a better distribution of the suspension in general.

Figure 7:
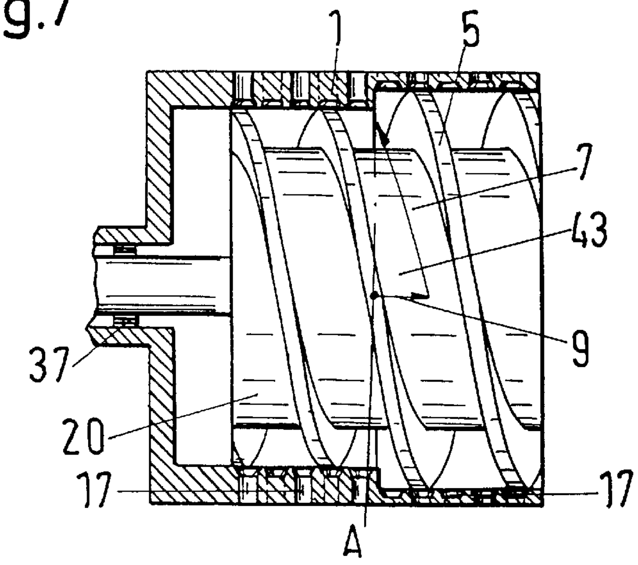
FIG. 7 shows an arrangement in accordance with FIG. 1 in which the helix and the sieve drum are stepped.

In the example of FIG. 7 the inner side of the drum 1 is stepped. The greater diameter is at the ejection side. The helix 5 executes an outward radial step at one point A. The rear initial position for an ejection on the second flank 9 of a sawtooth is predetermined in such a manner that the point A cannot move into the shoulder at the diameter step. During the ejection the filter cake moves over the diameter step and is again broken up. It can be advantageous in certain products to set the ejection movement 9 to be so slow that a re-layering takes place at the diameter step. The backward rotation of the helix into the original axial initial position takes place on the first flank 7 of the sawtooth, whereas a specific rotational angle is moved through tangentially. At the diameter step point A of the helix 5 there is a cutting edge 43 which cuts backwardly into the cake, which has been re-layered at the diameter step of the drum. The rotation angle is set through the choice of a corresponding axial stroke in such a manner that it does not correspond to an integral fraction of 360° in order that as time progresses all regions of the shoulder in the drum 1 are cut free once by this cutting edge. The action of the cutting edge at the drum rear side is analogous.

Figure 8:
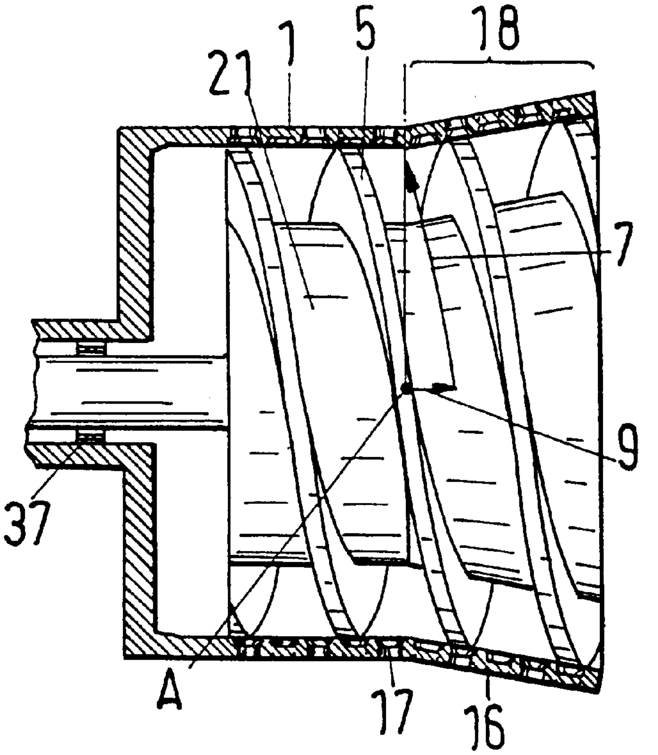
FIG. 8 shows an arrangement in accordance with FIG. 1 in which the helix and the drum have a region which opens conically in the ejection direction.

In the example of FIG. 8 a conical section 18 in the drum 1 and the helix 5 adjoins at a cylindrical part of the filling zone 21. In this conical zone the ejection of the cake is assisted by the centrifugal forces at the cake and by the inclination of the cone of the drum 1. During the ejection on the second flank 9 of a sawtooth the clearance of a point A increases in the conical section 18 of the drum 1. Here as well the consideration holds that the rotation angle which is reached with the moving back is not an integral fraction of 360° in order that all surfaces in the conical section come to profit once from the small clearance at the beginning of the ejection movement and that no permanent deposits arise.

Figure 9:
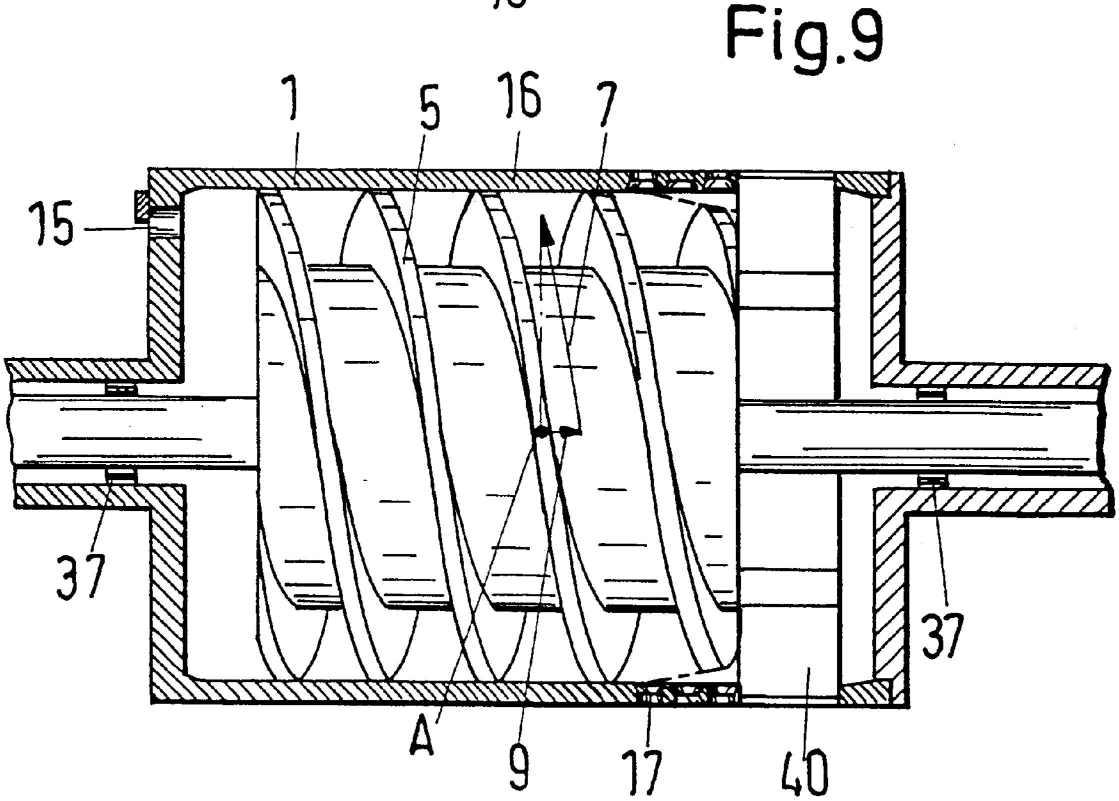
FIG. 9 shows an arrangement in accordance with FIG. 2 in which a cylindrical drum is executed as a sieve in the direction towards the ejection side, whereas the helix is radially retracted in the direction towards the ejection side.

In the example of FIG. 9 the drum 1 with its jacket surface 16 is journalled cylindrically and at both sides with bearings 37 and is assembled from two bodies in order to be able to introduce the inner parts. The product supply (here not illustrated) takes place through a hollow stub shaft of the helix 5. Adjustable outlet openings 15 determine the level of the liquid. The surface 16 is executed as a sieve 17 only towards the outlet. In this sieve region the radial height of the helix diminishes, with a cone as envelope surface. The cake is released through a spin-off window 40 at the outlet side.

In FIGS. 10 to 13 different kinds of sawtooth lines 6 are illustrated, the shape of which depends on the kind of the drive for the relative movement, i.e. on the kind of the sawtooth converter.

Figure 12:
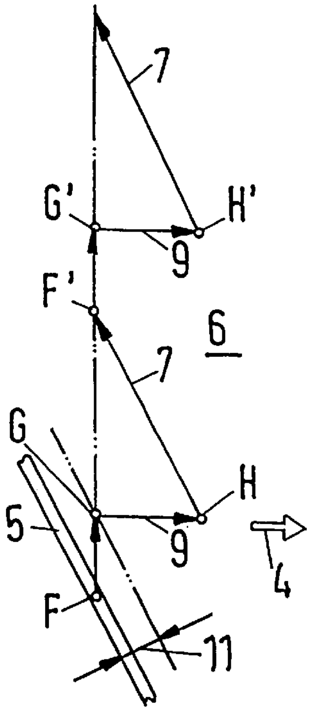
FIG. 12 shows a sawtooth line as in FIG. 10 which is produced with a constant relative rotation between the drum and the helix and with an axial piston which is limited in its stroke.
Figure 13:
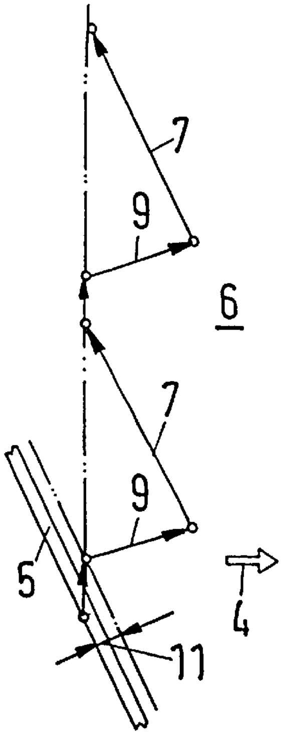
FIG. 13 shows a sawtooth line as in FIG. 10 which is produced with a constant but low relative rotation between the helix and the drum and with a slow backward stroke and a rapid ejection stroke, with it being desirable for the inclination of the first flank, i.e. during the backward stroke, to correspond approximately with the pitch of the helix.

In FIGS. 12 and 13 it is shown that a trench 11 can also be produced by a continuous rotational movement between the helix 5 and the drum 1 if a suitable axial movement is superimposed on it. During a standstill of the axial movement in the initial position a point F is displaced to G and produces a trench 11 in its "wake" as long as the cake only deforms. The axial ejection from G to H takes place abruptly and the cake makes a jump. From H to F' the reference point moves back in the track of the helix. The moving to the further points G', H' the sawtooth line are repetitions. Since the inclination a of the first flank 7 of a sawtooth is predetermined by the pitch β of the helix, during a predetermined constant rotation between the helix and the drum only the ejection speed on the second flank 9 of a sawtooth can still be reduced in order to produce a trench which is more or less broad than in FIG. 13.

Figure 14:
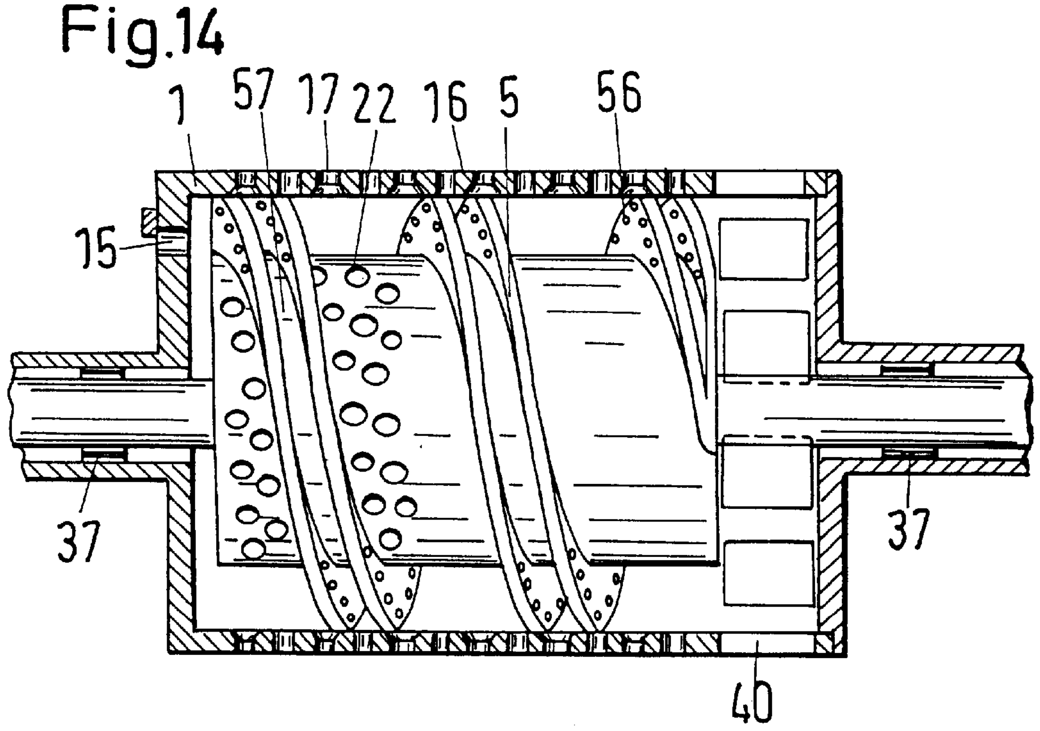
FIG. 14 shows an arrangement in accordance with FIG. 2 in which the helix is executed as a filtering spiral.

In FIG. 14 the helix 5 is designed as a double helix with axial holes 56 in order to form a filtering spiral 57 which in addition collects axially emerging liquid and delivers it to the outside through the sieve 17. The filling zone with apertures 22 is attached oppositely to the discharge windows 40 of the ejection side.

Figure 15:
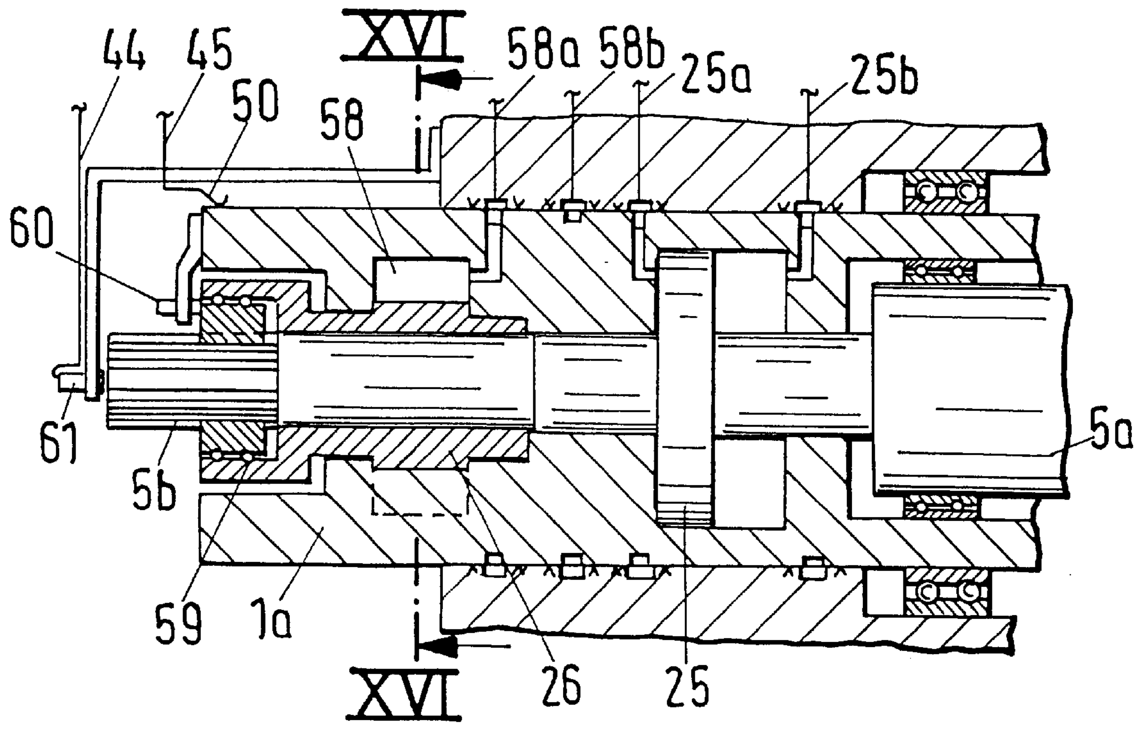
FIG. 15 shows a hydraulically driven mechanism for producing a sawtooth line.
Figure 16:
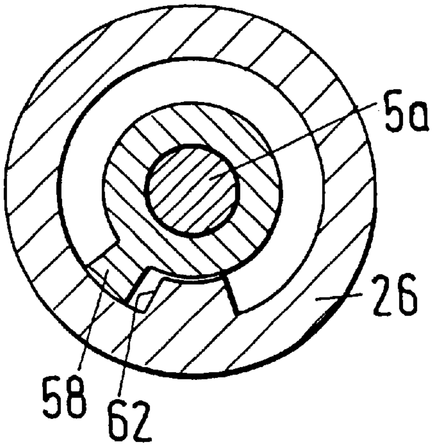
FIG. 16 is a section through a rotary piston in FIG. 15.

In FIG. 15 a rotary piston 58, the pivotal range of which is visible in FIG. 16, is combined as a hydraulic rotational drive 25 with a free-wheel 59 in such a manner that a supporting of the helix at the filter cake suffices in order to rotate back the rotary piston into its original initial position after a backwards rotation corresponding to the second flank of a sawtooth and then to execute an ejection movement in the axial direction with a hydraulic piston 25. The desired position of the helix with its axis 5*a* relative to the axis 1*a* of the drum is predetermined by a control system (not shown here), whereas the actual position with respect to the relative rotation between the helix and the drum is sampled by a sensor 60 and the actual axial position of the helix is sampled by a sensor 61. The rotary piston 58 is controlled via supply lines 58*a*, 58*b* by means of oil in order to execute a rotational movement relative to the drum, which is transmitted during the backwards rotation of the helix through the blocked free-wheel 59 to the axis 5*a* of the helix 5, whereas the returning of the rotary piston 58 into its original position takes place without a rotation of the helix through a releasing of the free-wheel 59. The ejection piston 25 is controlled via oil lines 25*a*, 25*b* and provides the axial displacement between the helix axis 5*a* and the drum axis 1*a*.

In the illustrated piston position the rotary piston 58 has already been rotated back into its initial position through the release in the free-wheel 59 and is held firmly at an abutment 62 by the oil pressure. If now the ejection piston 25 is excited for a predetermined rapid ejection movement, the helix shaft 5*a* is displaced to the right and ejects a portion of the filter cake. If there is the suspicion that in the event of a large pitch an impermissible backward rotation takes place during the ejection movement, the free-wheel 59 can be replaced by an electromagnetic clutch which fixes the two shafts to one another with respect to rotation during the ejection movement. Despite the blocked rotation an axial displacement can take place between the inner part of the clutch and the actual helix shaft 5*a* as well as in the inner part of the free-wheel 59 because the helix end 5*b* is displaceable in the inner part as a toothed shaft.

After the end of the ejection movement on the first flank 7 of a sawtooth a selectable pause can be switched in with respect to the relative movement between the helix 5 and the drum 1. The second flank 9 of the sawtooth presupposes an inclination corresponding to the pitch of the helix. This predetermined inclination is produced by the control system in that for example a rotational speed is predetermined for the rotary piston 58 and an axial displacement velocity corresponding to the helix is predetermined for the hydraulic piston 25. Depending on the precision requirements the hydraulic displacement elements 58, 25 can be operated as an open control loop in which the sensors 60, 61 assume only the function of end switches or as a closed control loop in which the sensors 60, 61 continually transmit the actual position values to the control system. In the use of a free-wheel 59 the helix shaft 5*a*, 5*b* is necessarily taken along by the rotary piston 58.

Figure 17:
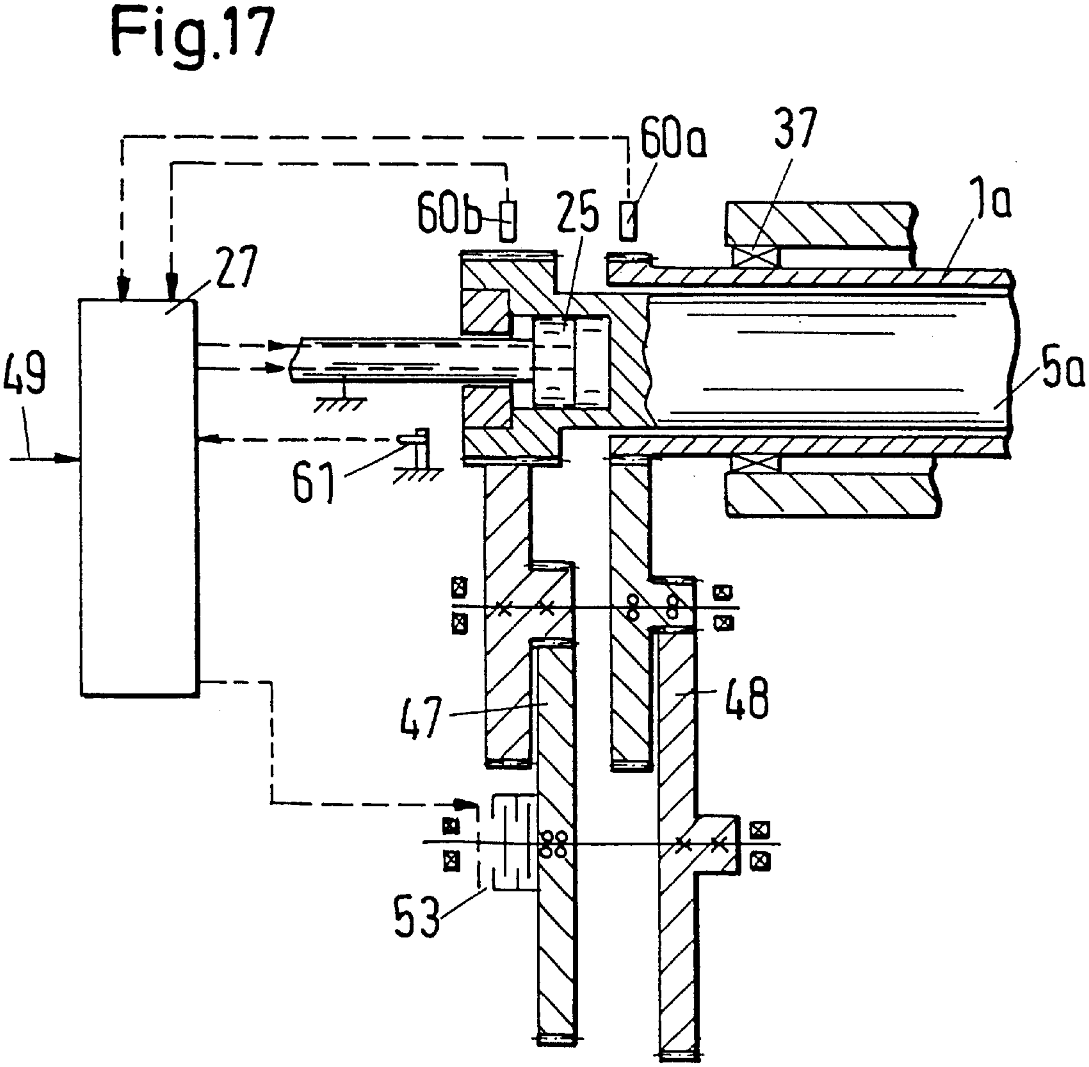
FIG. 17 shows a transmission arrangement with a viscous coupling in order to produce a relative rotation between the drum and the helix.

If a clutch is used the latter must be engaged in order to transmit a rotational movement to the helix shaft 5*a*. In the embodiment in accordance with FIGS. 15 and 16 it is assumed that the actual centrifuge drive takes place at the drum shaft 1*a* as in FIG. 1. The measurement of the relative rotation between the drum shaft 1*a* and the helix shaft 5*a* and the transmission of an electrical signal via sliding rings 50 restricts the measuring possibilities of the sensor 60. It is likewise possible, as shown in FIG. 17, to form the difference by two absolutely measuring sensors 60*a*, 60*b* in a control system 27 to which corresponding desired values 49 are prescribed.

In example 17 the helix shaft 5*a* is moved axially back and forth along a stationarily anchored hydraulic piston 25. The main drive for the drum shaft 1*a* is provided as in FIG. 1. The movement of the drum shaft 1*a* is taken over via a gear set 48 and is transmitted via a viscous coupling 46 and a second gear set 47 to the helix shaft 5*a*. The slip in the coupling is regulated in such a manner that both shafts 5*a*, 1*a* rotate at the same speed in order to produce pauses for a depositing of the product and for a rapid ejection on the second flank 9 of a sawtooth, whereas in the backward rotation the slip on the first flank 7, which can be measured via the sensors 60*a*, 60*b*, is modified in such a manner that the helix rotates backwardly in its own path. This means that the gear sets 48, 47 must be stepped in such a manner that the helix shaft 5*a* would rotate more rapidly than the drum shaft 1*a* if the slip were nullified, since otherwise a sufficient torque would not arise to assist the relative rotational movement in the viscous coupling 53. The connection in the coupling 53 can take place with an electrically polarizable liquid, such as is known from electro-rheology and is marketed for example by the company Bayer, Leverkusen. Because the gear set 47 has an even toothing relative to the helix shaft 5*a*, the latter can be axially displaced. The axial movement is monitored by a sensor 61 and coordinated in the control system 27 through a comparison with the desired value input 49 for rotation and axial movement with the measurements of the sensors 60*a*, 60*b* for the regulation along a sawtooth line. This means that the control system 27 also comprises a hydraulic part by means of which the hydraulic piston 25 is excited.

The invention is not restricted to the previously listed embodiments of helical spirals. Thus the helical spirals used can be provided with interruptions in order to form a "segmented spiral" or can be executed with different leaf thickness over their length. It is likewise possible to slightly modify the pitch of the helix in specific regions or to provide the helix with closure elements for the sealing off of the drum.

What is claimed is:

1. Centrifuge comprising a rotating drum and an ejection element which rotates together with the drum in order to eject a cake of solids, which is deposited on an inner side of the drum, in an axial direction of the drum, the ejection element having an ejector surface in the form of a screw-shaped helix, the helix and the drum being kinematically connected so that a reference point at a circumference of the helix executes a rotational movement relative to the drum in the shape of a sawtooth line, a first flank of the sawtooth line corresponding approximately in its inclination ($\alpha$) to a pitch ($\beta$) of the helix and a second flank of the sawtooth line corresponding to an approximately axial ejection movement.

2. Centrifuge in accordance with claim 1, wherein the inclination ($\alpha$) of the first flank corresponds exactly to the pitch ($\beta$) of the helix.

3. Centrifuge in accordance with claim 2, wherein the inclination ($\alpha$) of the first flank deviates from the pitch ($\beta$) of the screw-shaped helix by up to plus or minus 20% in order to produce a trench in the depositing cake in passing through the first flank.

4. Centrifuge in accordance with claim 1, wherein an axial length of the sawtooth line amounts to only a fraction of an axial length of the screw-shaped helix.

5. Centrifuge in accordance with claim 1, wherein at least one side wall of the drum has outlet openings for liquid components.

6. Centrifuge in accordance with claim 1, wherein at least one part of a surface of the drum comprises a sieve.

7. Centrifuge in accordance with claim 1, wherein the helix comprises a multiple thread helix.

8. Centrifuge in accordance with claim 1, wherein the helix and the drum form a plurality of steps with different diameters.

9. Centrifuge in accordance with claim 1, wherein the drum and the screw-shaped helix conically widen or narrow in the ejection direction at least in a same axial section, the axial stroke being dimensioned so that conical, mutually oppositely lying sections can rotate relative to one another.

10. Centrifuge in accordance with claim 1, wherein the screw-shaped helix comprises a ribbon spiral.

11. Centrifuge in accordance with claim 1, wherein the screw-shaped helix comprises a filtering spiral.

12. Centrifuge in accordance with claim 1, wherein the screw-shaped helix is secured at a hollow shaft which has at least one filling zone with apertures for a suspension.

13. Centrifuge in accordance with claim 9, wherein the hollow shaft has at least one further zone with apertures for the introduction of media.

14. Centrifuge in accordance with claim 13 wherein the media comprises one of a washing liquid and a reagent.

15. Centrifuge in accordance with claim 1, wherein relative movement between the helix and the drum can be maintained as long as desired at least at a turning point of the sawteeth.

16. Centrifuge in accordance with claim 1, including means for setting the speed for passing through the flank of a sawtooth.

17. Centrifuge in accordance with claim 1, including a hydraulic piston for generating an axial displacement between the helix and the drum; and a hydraulically activated rotational drive between the drum and the helix.

18. Centrifuge in accordance with claim 1, wherein relative rotational movement between the helix and the drum takes place continuously, and an intended inclination of the flanks of a sawtooth line takes place through controlling the speed of an axial piston.

19. Centrifuge in accordance with claim 1, including a control for the centrifuge which is designed so that the sawtooth line can be passed through in both directions.

20. Method for operating a centrifuge having a rotatable drum and a rotatable screw-shaped helix disposed within and cooperating with the drum for ejecting a cake of solids deposited on an inner side of the drum comprising rotating the drum and the screw-shaped helix, and moving the helix relative to the drum so that a reference point on a circumference of the helix executes a rotational movement in the shape of a sawtooth line having a first flank with an inclination corresponding approximately to a pitch of the helix and a second flank having an inclination corresponding approximately to an axial ejection movement.

* * * * *